UNITED STATES PATENT OFFICE 2,205,634

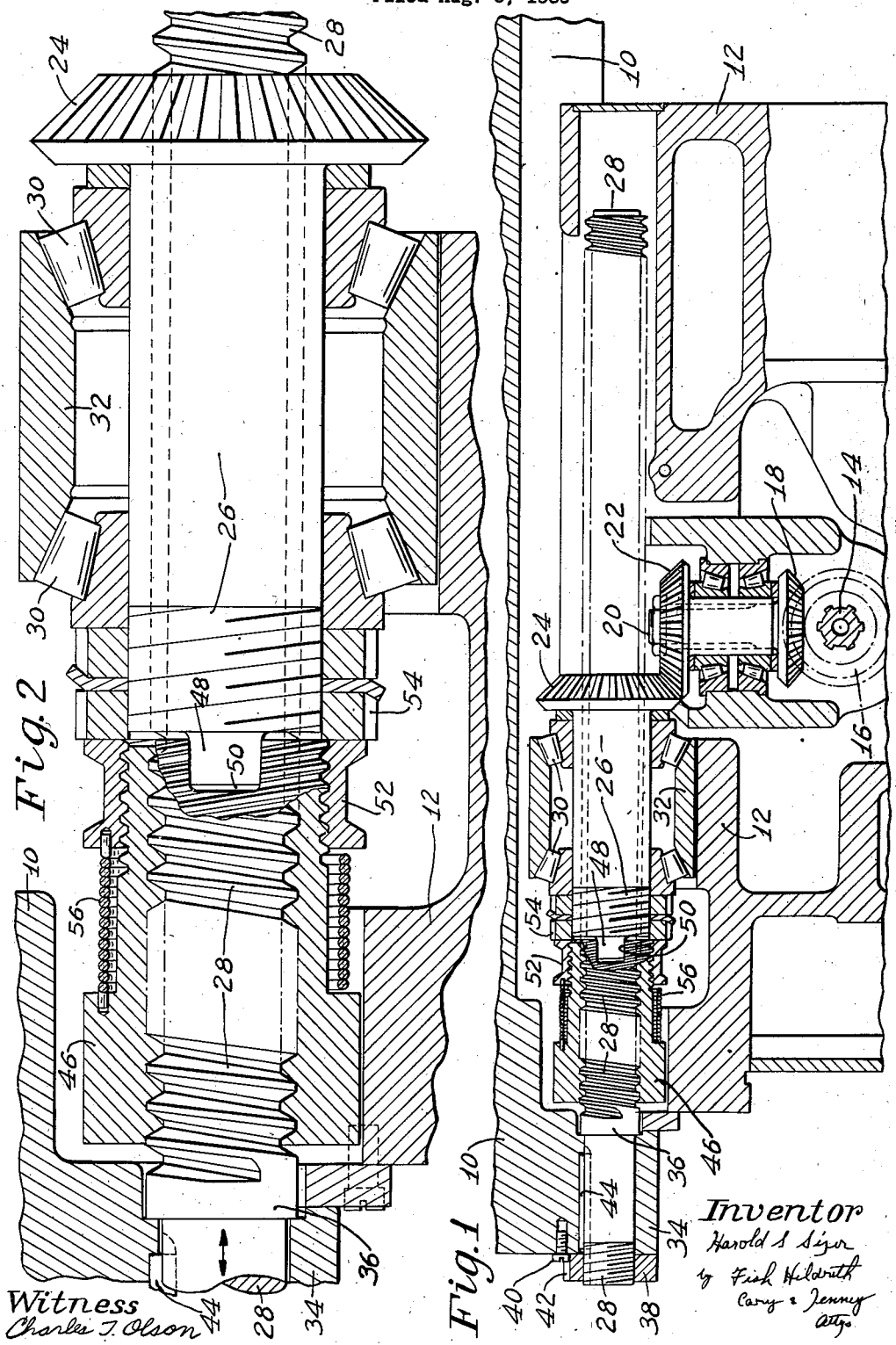

SCREW AND NUT DRIVING CONNECTION

Harold S. Sizer, Pawtucket, R. I., assignor to Associated Patents, Inc., a corporation of Ohio Application August 5, 1939, Serial No. 288,645

8 Claims. (Cl. 90—22)

The present invention relates to improvements in a screw and nut driving connection for a machine tool support having mechanism for removing backlash between the relatively movable screw and nut elements of the driving connection. The invention is herein disclosed as embodied in a milling machine having cooperating screw and nut driving connections for a transversely movable work supporting table.

Numerous attempts have been made to develop a screw and nut driving connection having mechanism to eliminate backlash in the connection, suitable for effecting the relative translatory movements of the work and cutter of a milling machine which would adapt the machine equally for plain and hook milling, under shop conditions. Such devices without exception, have proposed to eliminate the backlash between the screw and nut elements having the conventional construction and arrangement of these parts, and in which a non self-locking screw helix angle of 7° or more is employed. Such devices which are intended to adapt the machine for both plain and hook milling in either direction, ordinarily include with the main driving nut, a supplemental take-up nut and take-up means for imparting relative axial movements to the nuts capable of withstanding the heaviest operating load to which the machine may be subjected. In such devices of the prior art, of which the patent to Graves and Bennett No. 2,124,852, dated July 26, 1938, may be considered an example, even where an irreversible take-up action is employed, it has been found necessary to utilize very heavy opposed nut pressures which may be in the order of 500 to 1000 pounds, in order to satisfactorily eliminate backlash, and to introduce enough friction to prevent the machine from running away under maximum cutting loads during hook milling. As applied to existing machines in which the helix angle of the feed screw is conventionally set at a non self-locking angle of 7° or more for maximum efficiency and speed of the table drive, the relatively heavy opposed nut pressure is required in order to prevent relative rotational movement of the feed screw and nut elements with resulting displacement of the table and consequent injury to the work and to the machine under maximum load during hook milling. While the use of such heavy take-up pressures serves to insure accurate operation of the machine, it will readily be seen that very high frictional forces are set up, with the result that an excessive amount of resistance and wear is encountered in the driving connection. In constructions of the prior art, as exemplified in the Bennett et al. patent above referred to, it has been found desirable to employ an ease-off mechanism of some description, which operates at frequent intervals during machine operation to substantially reduce these forces to a normal or minimum value.

It is a principal object of the invention to provide a novel and improved screw and nut driving connection including mechanism to eliminate backlash in the screw and nut connection which is particularly adapted for effecting relative movement of the work table and cutter of a milling machine to eliminate backlash during the making of hook milling or chattering cuts. More specifically, it is an object of the present invention to provide a novel and improved screw and nut driving connection of this general description having mechanism to eliminate backlash in the connections which is well adapted to prevent any displacement or running away of the machine under maximum load hook milling cuts, and which at the same time is so constructed and arranged as to eliminate the extremely heavy and injurious stresses required to be set up in the devices of the prior art to insure proper operation of the machine.

It is still another object of the invention to provide a novel and improved screw and nut driving connection of this general description having mechanism to remove backlash from the driving connection, which may be left in active operation during quick traverse or hand manipulation of the movable support, and which may be left continuously in operation at all times during machine operation.

With these and other objects in view as may hereinafter appear, a feature of the invention consists in the provision of a feed screw and nut having the threaded portions thereof arranged at an irreversible or self-locking angle in combination with a similarly irreversible take-up device including take-up tensioning means arranged to exert a relatively light take-up pressure which may be in the order of 50 to 100 pounds to maintain a snug but not excessively tight operating fit between the screw and nut elements of the driving connection.

Another feature of the invention consists in the combination with the feed screw and nut driving connection having the thread helix set at an irreversible or self-locking angle, of a take-up mechanism which comprises a supplemental take-up nut threaded to the screw and keyed to the driving nut, and take-up means including actuating surfaces cammed at an irreversible or self-locking angle to effect relative axial movement of the nuts, and tensioning means acting thereon arranged to exert a relatively light axially directed take-up pressure between the nuts.

The several features of the invention consist also in the devices, combinations and arrangement of parts hereinafter described and claimed, which together with the advantages to be obtained thereby will be readily understood by one skilled in the art from the following description taken in connection with the accompanying drawing, in which Fig. 1 is a detail sectional view illustrating applicant's improved screw and nut driving connection having means to eliminate backlash in the connection, as embodied in a milling machine, only so much of the machine being shown as is believed necessary to illustrate the connection of the present invention therewith; and Fig. 2 is an enlarged detail view of the screw and nut connection shown in Fig. 1.

For purposes of illustration, the invention is herein disclosed as embodied in a milling machine of the general type illustrated in the patent to Bennett and Krause No. 2,082,140, dated June 1, 1937. The construction and arrangement of the machine and the driving connections therefor may be considered to be substantially the same as those illustrated in the above-mentioned patent, except for the substitution of the screw and nut driving connection for the rack and pinion drive illustrated in that patent. As more fully shown in that patent, and as indicated in the drawing, the machine is provided with a transversely movable work table 10, slidably supported in ways on a knee member 12 which is vertically adjustable with relation to a machine column and a milling cutter (not shown). Translatory movements are imparted to the work table through driving connections mounted on the knee. These connections, as in the patent above referred to, may comprise a reversible electric motor, feed and traverse gear trains actuated therefrom, and clutching means having an intermediate neutral, and alternative feed and traverse positions for controlling the operation of a drive shaft 14 in the knee member 12. The drive is taken from the drive shaft 14 through a bevel gear 16 which meshes with a bevel gear 18 in the lower end of a short vertically disposed shaft 20. A bevel gear 22 secured to the upper end of the shaft 20 meshes with a bevel gear 24 rigidly secured on one end of a driving nut 26 screw-threaded on a feed screw 28. The driving nut 26 is rigidly supported against axial movement with relation to the knee member 12 by means of roller bearings 30 supported within a sleeve bearing 32 on the knee. The feed screw 28 is rigidly secured against axial or rotational movement in a depending lug 34 formed on the left hand end of the table 10. The feed screw 28 is secured against axial movements with relation to the lug 34 by means of a collar 36 on the feed screw 28 which engages against one side of the lug, and a check nut 38 screw-threaded to the end of the feed screw which is tightened against the opposite side of the lug 34. A lock nut 40 screw-threaded into the lug 34 engages with a slot 42 in the clamping nut 38 to hold the parts in locked position. A key 44 acts to prevent rotational movement of the feed screw 28 in the lug 34.

As shown in the drawing, there is also provided a supplemental take-up nut 46 which is screw-threaded on the feed screw 28 adjacent to the driving nut 26. The supplemental nut 46 is keyed to turn with the driving nut 26 so that a constant angular relation is maintained between the two nuts, by means of a tongue 48 formed on the end of the driving nut 26 which engages in a correspondingly formed recess 50 in the supplemental nut 46. The construction and arrangement of applicant's feed screw 28 and nuts 26 and 46 is novel, in that a smaller than usual thread helix angle is employed which is mathematically determined to secure a self-locking or fully irreversible driving relation between the feed screw and nut elements.

Further in accordance with the present invention, applicant provides a take-up device which cooperates with the feed screw and nut elements above described, to eliminate backlash in the driving connection which would otherwise cause faulty operation and probable injury to the machine during the performance of hook milling or chattering cuts. The take-up mechanism referred to, comprises with the supplemental nut 46, a take-up member in the form of a sleeve 52 screw-threaded to the supplemental nut 46 and arranged to bear axially against a cooperating plane surface on the driving nut 26 provided by a check nut 54 thereon. A torsion spring 56 coiled about the periphery of the supplemental nut 46 and connected at one end to a shouldered portion of the supplemental nut 46, and at its other end to the take-up member 52, urges the take-up member 52 in a direction to engage the take-up member 52 with the cooperating plane surface on the check nut 54 to effect a relative axial spreading movement of the two nuts 26 and 46 to take up any backlash in the connections. It may be noted that the screw-threaded connection between the supplemental nut 46 and the take-up member 52 is of the opposite hand from the threads of the feed screw 28. As hereinafter more fully set forth, the thread helix of the cooperating threads on the supplemental nut 46 and take-up member 52 is set at a self-locking angle to produce a fully irreversible take-up action of the device. Further in accordance with the present invention, a relatively light spring pressure is employed acting through the take-up member 52 to provide an opposed take-up nut pressure between the contacting surfaces of the take-up member 52 and the check nut 54 on the driving nut 26 which is sufficient only to take up backlash in the connections, but without building up additional or excessive pressures between the screw and nut elements which would cause undue wear or offer substantial resistance to the relative rotational movements of the screw and nut elements during operation of the table at a rapid traverse rate or by hand. In the example under consideration, the opposed nut pressure thus provided by the spring 56 and take-up member 52 may be assumed to have a value of between 50 and 100 lbs.

In the illustrated embodiment of the invention in a milling machine, a bronze driving nut 26, a bronze supplemental take-up nut 46, and a ground steel screw 48 are employed. The threads of the screw and nuts, and also the threads of the take-up member 52, have a helix angle of 5°4′, and an included thread angle of 60°. The screw and nut driving connection having the included thread angle and helix angle above set forth, are fully self-locking, as will readily be apparent from the following discussion.

Extensive tests have indicated that the lowest value of the coefficient of friction of a steel screw and a bronze nut is about .09 in accordance with the relation $$\text{Coefficient of friction} = \frac{\text{Force to produce sliding}}{\text{Pressure between the sliding surfaces}}$$

The friction angle is an angle whose tangent is equal to the coefficient of friction. For self-locking conditions the helix angle (H) of the screw thread must not be greater than this friction angle. To allow some margin of safety which would take care of the friction reducing effects of vibration, a value of less than .09, and preferably approximating .07 is assumed as a desirable value of the coefficient of friction. If a square thread were employed, and without opposed nut pressure, it may be assumed that a thread helix angle (H) of 4° would be self-locking in accordance with the relation $$\text{Tan H } (4°) = .07$$

When, however, V-shaped threads having an included thread angle (I) are used, the wedge effect of the thread face produces a greater amount of friction between the cooperating screw and nut elements permitting a steeper helix angle to be used in accordance with the following relation:

$$\text{Tan H cosine } \frac{I}{2} = .07$$

Substituting figures in this equation, it will be seen that $$\text{Tan } 5°4' \cos \frac{60}{2} = .077$$

which is a less than critical locking angle.

In order to calculate a helix angle for the feed screw which will be self-locking under a maximum load during hook milling, the following relation is employed in which F is the maximum pull which the cutter will effect on the work (about 400 pounds per H. P.), and P is the axial opposed nut pressure (50 pounds):

$$(F+P) \tan \left( H - \tan^{-1} \frac{.07}{\cos \frac{I}{2}} \right) \leq P \tan \left( H + \tan^{-1} \frac{.07}{\cos \frac{I}{2}} \right)$$

In this relation the values to the left of the equal sign define the torque tending to rotate the screw nut at a rate to exceed that determined by the prime mover and the associated normal nut driving mechanism. The values to the right of the equal sign represent the frictional resistance of the self-locking connection. Assuming a 2 H. P. cut in which F=800, and an opposed nut pressure P of 50 pounds, and substituting figures in the above equation as follows:

$$(800+50)\tan(5°4'-4°37') \leq 50 \tan(5°4'+4°37')$$

$$850 \times .0067 \leq 50 \times .171$$

$$5.695 \leq 8.55$$

Since a minus value is obtained, indicating that the frictional resistance represented by the values on the right side of the equation is greater than the overdriving torque represented by the values on the left side of the equation, it will readily be seen that the screw is self-locking under conditions in which the value of the coefficient of friction is approximately .07.

The mode of operation of applicant's improved screw and nut driving connection having mechanism to eliminate backlash in the connection, may be described as follows:

The torsion spring 56 tends to rotate the take-up member 52 in a direction to maintain an opposed nut pressure of substantially 50 pounds between the contacting surface on the take-up member 52 and on the check nut secured to the driving nut 26. Due to the fact that the take-up member 50 is screw-threaded to the take-up nut 46 at an irreversible friction or self-locking angle, a positive metal to metal contact is maintained through the take-up mechanism which has no tendency to yield against the thrust of the cutter during hook milling. A relatively light opposed nut pressure of about 50 pounds has been found sufficient to squeeze out excess oil and insure a tight operating fit between the screw and nut elements of the connection, but is not great enough to cause undue wear, or to offer high resistance to relative rotational movement of the screw and nut when the table is operated either at the rapid traverse rate or by hand. It will be understood that in heavy machines adapted for making power cuts in the order of 6 to 8 H. P., the opposed nut pressure may be increased to 100 or even 150 pounds without materially increasing the frictional resistance in the driving connection.

Assuming that the table is moving toward its extreme position to the right during hook milling, the milling cutter will tend to drive the table in advance of the driving connections. In the illustrated construction, the force exerted by the milling cutter will be taken up by the contacting engagement of the supplemental nut 46 with the feed screw 28, but owing to the self-locking helix angle of the threads of the feed screw 28, there is no tendency of the supplemental take-up nut 46 to rotate by reason of this force. The force of the driving load is then transmitted to the take-up member 52 through the similarly irreversible screw-threaded connection of the take-up member 52 with the nut 46, and thence through the driving nut 26 and roller bearings 30 to the bearing 32 on the knee.

It will be understood that the advantage of applicant's construction derives primarily from the use of a screw and nut connection in which the thread helix of the screw is set at a fully self-locking angle in combination with a similarly self-locking take-up mechanism in which any tendency to relative rotational movement of the screw and nut elements by virtue of axially directed thrust forces, is entirely eliminated. While in the preferred form, opposed nut pressures which may be in the order of 50 to 150 pounds are preferred, applicant does not intend to be limited to any specific value for the opposed nut pressure.

It may be further pointed out that a certain advantage is derived from the use of a driving nut 26 which is directly supported against axial movement in both directions on its support in combination with the floating take-up nut 46 in order to avoid any excessive building up of pressure due to possible deflections of the bearing, collar, nut or housing under cutting load.

It will be understood that the invention is not limited to the specific embodiment shown, and that various deviations may be made therefrom without departing from the spirit and scope of the appended claims.

What is claimed is:

1. In a screw and nut driving connection for moving one support with relation to another having mechanism for removing backlash from the driving connection, the combination of a screw mounted on one of said supports, a nut threaded to the screw and mounted on the other of said supports, said screw having the thread helix thereof arranged at a self-locking angle, means for causing relative rotation between the screw and the nut, a second nut threaded to the screw, and a take-up device comprising tensioning means, and take-up means actuated thereby having an irreversible take-up action to impart relative take-up movements to said nuts.

2. In a screw and nut driving connection for moving one support with relation to another having mechanism for removing backlash from the driving connection, the combination of a screw mounted on one of said supports, a nut threaded to the screw and mounted on the other of said supports, said screw having the thread helix thereof arranged at a self-locking angle, means for causing relative rotation between the screw and the nut, a take-up nut screw-threaded to the screw, take-up means for imparting a relative take-up movement to the nuts comprising relatively movable actuating surfaces cammed at a self-locking angle to impart an irreversible relative take-up action to the nuts, and tensioning means arranged for exerting a take-up tensioning strain on said take-up means.

3. In a screw and nut driving connection for moving one support with relation to another having mechanism for removing backlash from the driving connection, the combination of a screw mounted on one of said supports, a nut threaded to the screw and mounted on the other of said supports, said screw having the thread helix thereof arranged at a self-locking angle substantially in accordance with the equation: tan (screw helix angle) times cos (½ included thread angle) =.07, means for causing relative rotation between the screw and nut, a take-up nut screw-threaded to the screw, take-up means for imparting a relative take-up movement to the nuts comprising relatively movable actuating surfaces cammed at a self-locking angle to impart an irreversible relative take-up action to the nuts, and tensioning means arranged to exert a take-up tensioning strain on said take-up means.

4. In a screw and nut driving connection for moving one support with relation to another support having mechanism for removing backlash from the driving connection, the combination of a screw on one of said supports and a pair of nuts threaded to the screw and supported against axial movement with the screw on the other of said supports, said threads being arranged at a self-locking helix angle, means for maintaining a constant angular relationship between the nuts, means for causing relative rotation between the screw and the nuts, a take-up element movable with relation to the nuts, and having actuating surfaces cammed at a self-locking cam angle to impart relative axial take-up movements to the nuts, and tensioning means for imparting a take-up action to the take-up element.

5. In a screw and nut connection for moving one support with relation to another having mechanism for removing backlash from the driving connection, the combination of a screw on one of said supports, a pair of nuts threaded to the screw and supported against axial movement with the screw on the other of said supports, said threads having a self-locking helix angle substantially in accordance with the following equation: tangent (screw helix angle) times cosine (½ the included thread angle) equals the coefficient of friction, means for maintaining a constant angular relationship between the nuts, means for causing relative rotation between the screw and the nuts, a take-up element co-axially and rotatably supported with relation to the nuts and having a screw-threaded engagement therewith to impart relative axial take-up movements to the nuts, said take-up threads having a self-locking helix angle in accordance with said equation, and tensioning means for imparting a take-up action to the take-up element.

6. In a screw and nut driving connection for moving one support with relation to another support having mechanism for removing backlash from the driving connection, a screw rigidly secured to one of said supports, a driving nut having a self-locking threaded connection with said screw and supported against axial movement with the screw on the other of said supports, an auxiliary take-up nut threaded on the screw, means for maintaining a constant angular relationship between said driving and auxiliary nuts, a take-up element having a self-locking threaded engagement with one of said nuts whereby rotational movement of the take-up element relative to the nuts will impart axial take-up movement to the take-up nut and a torsion spring connected between one of said nuts and the take-up element for imparting a rotational take-up movement to the take-up element relative to said nuts.

7. In a screw and nut driving connection for moving one support with relation to another support having mechanism for removing backlash from the driving connection, the combination of a feed screw on one of said supports, a pair of nuts having a self-locking threaded connection with said screw and supported against axial movement with the screw on the other of said supports, means for rotating one nut to effect relative movement of the supports, said rotated nut having bearings to take the thrust of relative support movement in either direction, means for maintaining a constant angular relationship between the nuts, a take-up device to control the relative axial positions of the nuts to maintain a tight working engagement between the nut elements and the screw comprising a torsional spring mounted co-axially with the nuts, a member yieldingly actuated by the spring and having a cam action to impart relative axial movement to said nuts, said cam action being effected by a self-locking threaded engagement between said member and one of the nuts.

8. A screw and nut driving connection for moving one support with relation to another having mechanism for removing backlash from the driving connection, which comprises a screw on one of said supports having a self-locking helix angle substantially in accordance with the equation: tangent (screw helix angle) times cosine (½ the included thread angle) equals .07, a pair of nuts threaded to the screw and supported against axial movement with the screw on the other of said supports, means for maintaining a constant angular relationship between the nuts, means for causing relative rotation between the screw and the nuts, and a take-up device comprising relatively movable actuating surfaces for imparting relative axial movements to the nuts cammed at a self-locking angle to impart an unyielding relative axial take-up movement to the nuts, tensioning means acting on said take-up means arranged to establish an opposed nut pressure in the order of 50 to 150 pounds, and means cooperating with said take-up device for supporting said nuts on the other of said supports against movement relatively thereto in either direction.

HAROLD S. SIZER.